Patented Oct. 25, 1932

1,884,498

UNITED STATES PATENT OFFICE

WILLIAM A. ADAMSON AND ALEXANDER J. WUERTZ, OF WILMINGTON, DELAWARE, ASSIGNORS TO E. I. DU PONT DE NEMOURS & COMPANY, OF WILMINGTON, DELAWARE, A CORPORATION OF DELAWARE

PRODUCTION OF DIBENZOYL-ALPHA-ALPHA-DIANTHRIMIDES

No Drawing. Application filed July 9, 1929. Serial No. 377,072.

This invention relates to an improved process of producing dibenzoyl-alpha-alpha-dianthrimides, and specifically a method of producing the said dianthrimides by condensing amino-benzoyl-amino-anthraquinone with a benzoyl-amino-chloro-anthraquinone.

In the United States Patents 971,224 and 971,225 there is described a method of producing dibenzoyl-amino-alpha-alpha-dianthrimides by the condensation of amino-benzoyl-amino-anthraquinones with benzoyl-amino-chloro-anthraquinones dissolved or suspended in nitro benzene in the presence of sodium acetate as a condensing agent. The dianthrimides are valuable intermediates for the production of dyes.

Our invention has for an object an improved method of effecting the condensation and producing the resulting condensation products.

We have discovered that when sodium carbonate is substituted for sodium acetate as the condensing agent, the reaction runs more smoothly and an improved product results.

By way of illustration of our process, we have given the following examples:

*Example 1.*—One part of 1-benzoyl-amino-5-amino-anthraquinone, 1.1 parts of 1-benzoyl-amino-4-chloro-anthraquinone, 0.1 part of cupric chloride, and 1.2 parts of dry sodium carbonate are introduced into 10 parts of nitro benzene and heated to boiling for a period of about four hours. At the end of this period the charge is cooled under agitation to a temperature of about 120° C. and filtered in an appropriate manner. The filtrate is washed with hot toluene, again with hot alcohol, and finally with boiling water to remove all solvent. After the filter cake has been sucked as dry as possible, it is dried in an air oven at a temperature of about 100° C.

*Example 2.*—One part of 1-benzoyl-amino-4-amino-anthraquinone, 1.1 parts of 1-benzoyl-amino-5-chloro-anthraquinone, 0.1 part of cupric chloride, and 1.2 parts of dry sodium carbonate are introduced into 10 parts of nitro benzene and heated to boiling for a period of about four hours. At the end of this period the charge is cooled, filtered and washed, as in Example 1.

*Example 3.*—One part of 1-benzoyl-amino-5-amino-anthraquinone, 1.1 parts of 1-benzoyl-amino-6-chloro-anthraquinone, 0.1 part of cupric chloride and 1.2 parts of dry sodium carbonate are introduced into a suitable solvent such as nitro benzene and heated to boiling for about four hours. The charge is then cooled, filtered and washed, as in Examples 1 and 2.

Our invention is not limited to the specific compounds, temperatures or conditions given hereabove. For example, we may use other compounds, such as 1-benzoyl-amino-8-amino-anthraquinone, as an amino body, together with 1-benzoyl-amino-5-chloro-anthraquinone, 1-benzoyl-amino-4-chloro-anthraquinone, or 1-benzoyl-amino-6-chloro-anthraquinone as chloro bodies. Nor is our process limited to the use of sodium carbonate as a condensing agent. Other alkali carbonates, such as potassium carbonate, may be employed.

Our improved process is attended with several unexpected advantages. The reaction proceeds much more smoothly with sodium carbonate as a condensing agent than with sodium acetate. The dibenzoyl-diamino-alpha, alpha-dianthrimides are of much better quality than any heretofore obtained, and an increase in yield of not less than 20% is obtained in every case. This result is all the more surprising, since it has been thought that the use of sodium carbonate in condensations of this type would result in hydrolysis of the benzoyl groups to the impairment of the reaction. On the contrary, the improved quality and increased yields of the resulting dibenzoyl-diamino-alpha, alpha-dianthrimide compounds occur as an entirely unexpected result, yielding a greatly improved quality in the dyes produced from the dianthrimides as intermediates.

As many apparently widely different embodiments of this invention may be made without departing from the spirit thereof, it is to be understood that we do not limit ourselves to the foregoing examples or descriptions except as indicated in the following patent claims:

We claim:

1. The process of producing dibenzoyl-di-amino-alpha, alpha-dianthrimides which comprises condensing a benzoyl amino-amino-anthraquinone with a benzoyl amino-chloro-anthraquinone in the presence of an alkali-metal carbonate as a condensing agent.

2. The process of producing dibenzoyl-di-amino-alpha, alpha-dianthrimides which comprises condensing a benzoyl amino-amino-anthraquinone with a benzoyl amino-chloro-anthraquinone in the presence of sodium carbonate as a condensing agent.

3. The process of producing dibenzoyl-di-amino-alpha, alpha-dianthrimide which comprises condensing 1-benzoyl amino-5-amino-anthraquinone with 1-benzoyl amino-4-chloro-anthraquinone in the presence of an alkali-metal carbonate as a condensing agent.

4. The process of producing dibenzoyl-di-amino-alpha, alpha-dianthrimide which comprises condensing 1-benzoyl amino-5-amino-anthraquinone with 1-benzoyl amino-4-chloro-anthraquinone in the presence of sodium carbonate as a condensing agent.

5. The process which comprises heating about 1 part of 1-benzoyl-amino-5-amino-anthraquinone, about 1.1 parts of 1-benzoyl-amino-4-chloro-anthraquinone, about 0.1 part of cupric chloride and about 1.2 parts of dry alkali metal carbonate in about 10 parts of nitro benzene at a temperature of about 120° C. until a di-benzoyl-di-amino-alpha-alpha-dianthrimide is produced.

6. The process which comprises heating about 1 part of 1-benzoyl-amino-4-amino-anthraquinone, about 1.1 parts of 1-benzoyl-amino-5-chloro-anthraquinone, about 0.1 part of cupric chloride and about 1.2 parts of dry alkali metal carbonate in about 10 parts of nitro benzene at a temperature of about 120° C. until a di-benzoyl-di-amino-alpha-alpha-dianthrimide is produced.

7. The process of producing dibenzoyl-diamino dianthrimides which comprises condensing a benzoyl amino-amino-anthraquinone with a benzoyl amino-chloro-anthraquinone in the presence of an alkali-metal carbonate as a condensing agent.

8. The process of producing dibenzoyl-di amino-alpha, beta-dianthrimides which comprises condensing a benzoyl amino-amino-anthraquinone with a benzoyl amino-chloro-anthraquinone in the presence of an alkali-metal carbonate as a condensing agent.

9. The process which comprises heating about 1 part of 1-benzoyl-amino-5-amino-anthraquinone, about 1.1 parts of 1-benzoyl-amino-6-chloro-anthraquinone, about 0.1 part of cupric chloride and about 1.2 parts of dry alkali metal carbonate in boiling nitro benzene until a di-benzoyl-diamino-alpha-beta-dianthrimide is produced.

In testimony whereof we affix our signatures.

WILLIAM A. ADAMSON.
ALEXANDER J. WUERTZ.